(12) United States Patent
New et al.

(10) Patent No.: US 6,516,188 B1
(45) Date of Patent: Feb. 4, 2003

(54) METHOD AND APPARATUS FOR ACQUIRING EMERGENCY SERVICE IN A MOBILE RADIO COMMUNICATION SYSTEM

(75) Inventors: Wen J. New, San Diego; Jan C. Ault, Santee; Eric J. Lekven, Carlsbad; Isaac Ta-Yan Siu, San Diego; John R. Sorenson, San Diego; Paul T. Williamson, San Diego, all of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/447,462

(22) Filed: Nov. 22, 1999

(51) Int. Cl.[7] .............................................. H04M 11/00
(52) U.S. Cl. ....................... 455/404; 455/426; 455/434; 455/521; 455/454; 455/67.1; 455/423
(58) Field of Search ................... 455/404, 422, 455/426, 545, 521, 62, 67.1, 423, 168.1, 185.1, 455, 516, 434; 379/37, 45

(56) References Cited

U.S. PATENT DOCUMENTS

| | | | |
|---|---|---|---|
| 4,916,728 A | 4/1990 | Blair | |
| 5,463,675 A | 10/1995 | Gerszberg | |
| 5,742,904 A | 4/1998 | Pinder et al. | ................ 455/404 |
| 5,832,367 A | * 11/1998 | Bamburak et al. | ............ 455/62 |
| 5,937,344 A | * 8/1999 | Zicker | ........................ 455/404 |
| 6,185,412 B1 | * 2/2001 | Pentikainen et al. | ........ 455/404 |

* cited by examiner

*Primary Examiner*—Doris H. To
(74) *Attorney, Agent, or Firm*—Philip R. Wadworth; Charles D. Brown; George C. Pappas (57) ABSTRACT

A method and apparatus for acquiring an emergency service from one or more candidate mobile radio communication systems. An attempt is made by the mobile radio unit to acquire normal non-emergency service. If the attempt of acquiring normal non-emergency services fails and the user needs to originate an emergency call, an emergency scan list containing one or more candidate mobile radio communication systems is scanned, and an attempt is made to acquire emergency service from one of these systems. The emergency scan list is different from the normal preferred roaming list stored in the mobile radio unit. Next, the invention originates an emergency call in accordance with the service acquired from the emergency scan list.

25 Claims, 8 Drawing Sheets

METHOD AND APPARATUS FOR ACQUIRING EMERGENCY SERVICE IN A MOBILE RADIO COMMUNICATION SYSTEM

BACKGROUND OF THE INVENTION

I. Field of the Invention

The present invention relates generally to mobile radio communication systems. Specifically, the present invention relates to a mobile radio communication system that insures the acquisition of service from a service provider in cases where the mobile unit subscriber wishes to place an emergency call.

II. Description of the Prior Art

In wireless communication systems today, a mobile radio unit normally, when activated outside its home coverage area, attempts to acquire a servicing system based on a preferred roaming list (PRL) which is specified by the service carrier. Each service carrier provides specific PRLs based on roaming agreements with other carriers and the types of service a mobile radio unit customer is willing to purchase. Systems that are designated (or tagged) as "negative" systems on the PRL will not be accessed by the mobile radio unit for routine communications. Mobile radio telephones are typically configured such that a user cannot make a phone call on a system which is considered a negative system as specified by the PRL.

In situations where a mobile radio unit is outside its home coverage area, there may be instances where a mobile user cannot acquire service using the systems included on the PRL. This might occur, for example, if the preferred service provider for a given geographic area was unable to provide service to the user. Alternatively, there could be instances where no preferred service provider was specified in the PRL for a given geographic area. In such cases, if the user needs to place an emergency call, e.g., a 911 call, the user might not be able to originate the call due to the absence of service from the home service provider and the lack of a preferred service provider on the PRL. It is an object of the present invention to provide the user with emergency service in cases such as those described above, so as to allow a mobile user to complete an emergency call in cases where service might otherwise be unavailable to the user, e.g., to complete the emergency call on a "negative" system.

SUMMARY OF THE INVENTION

In accordance with a preferred embodiment, the present invention discloses a method and apparatus for acquiring emergency service from one or more candidate mobile radio communication systems. An attempt is made by the mobile radio unit to acquire normal non-emergency service. If the attempt to acquire normal non-emergency services fails and the user needs to originate an emergency call, the present invention scans an emergency scan list containing one or more candidate mobile radio communication systems and attempts to acquire emergency service from one of these systems. The emergency scan list is different from the normal preferred roaming list stored in the mobile radio unit. The invention originates an emergency call in accordance with the service acquired from the emergency scan list.

DETAILED DESCRIPTION OF THE INVENTION

Figure 1:
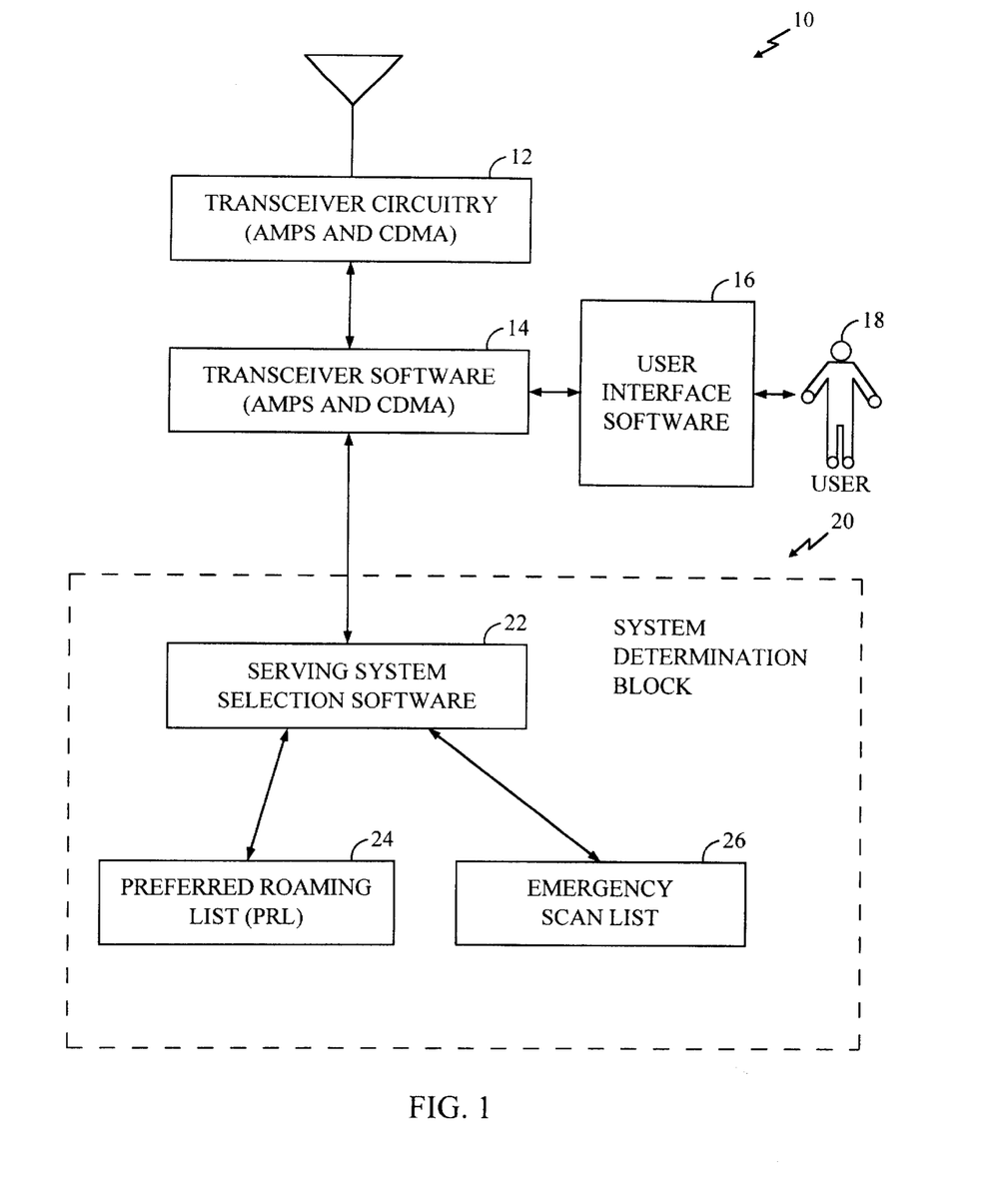
FIG. 1 is a block diagram representing the functional elements of the system of the present invention.

Referring to FIG. 1, there is shown a block diagram of a mobile radio unit that includes a system 10 for acquiring emergency service from one of a plurality of candidate mobile radio telephone systems in accordance with the present invention. The system includes transceiver circuitry 12 for use with both AMPS and CDMA channels. A transceiver software package 14 is also provided for both AMPS and CDMA channels and sends and receives information in connection with the transceiver circuitry 12. AMPS channels are typically broadcast in the cellular band (i.e., 800 MHz), while CDMA channels are broadcast in either the cellular band or the PCS band (i.e., 1900 MHz). Although in the embodiment shown, transceiver circuitry 12 and software 14 are adapted to transmit and receive information on AMPS and CDMA channels, it will be understood by those skilled in the art that transceiver circuitry 12 and software 14 could optionally be adapted to transmit and receive information using other communication technologies such as, for example, time division multiple access (TDMA). A user interface software package 16 is provided to interface with the user 18. The system determination block 20 includes serving system selection software 22, a preferred roaming list 24 and an emergency scan list 26. The serving system selection software 22 sends and receives information in connection with both the preferred roaming list 24 and the emergency scan list 26 to the transceiver software 14.

Figure 2:
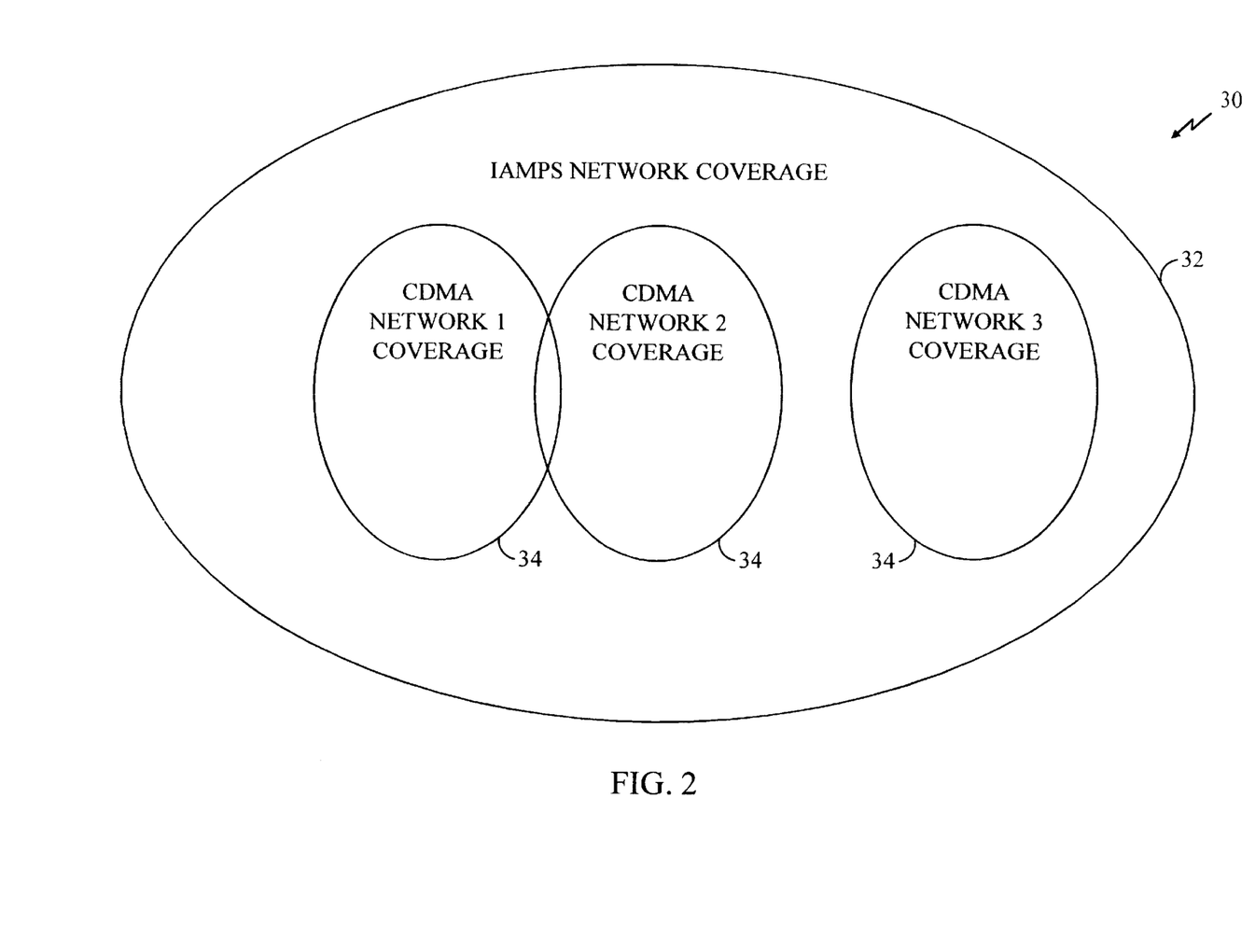
FIG. 2 is a diagram showing the coverage of two CDMA communications systems and AMPS A and B channels in an exemplary geographic area.

Referring to FIG. 2, there is shown a diagram depicting the coverage of two CDMA communication systems and AMPS A and B channels in an exemplary geographic area 30. AMPS network 32 is the most ubiquitous wireless network. Networks 34 that provide service in accordance with code division multiple access (CDMA) technology are also provided in area 30. The present invention provides a means to acquire emergency service in the various coverage areas shown in FIG. 2 in a manner that is independent of the mode for non-emergency service selected by the user.

Figure 3:
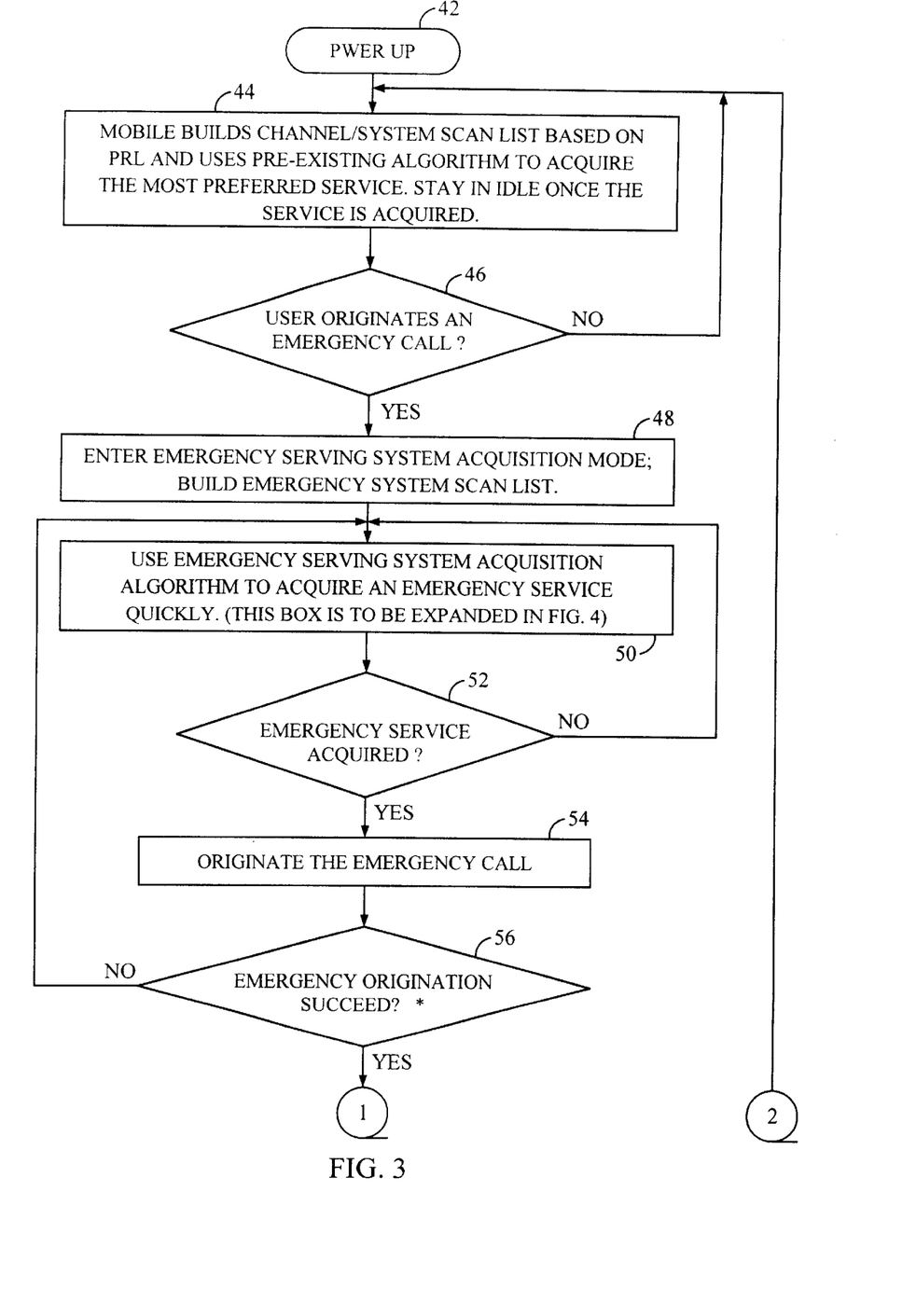
FIGS. 3, 3A show a flow diagram of a system for originating an emergency call in accordance with the present invention.
Figure 3A:
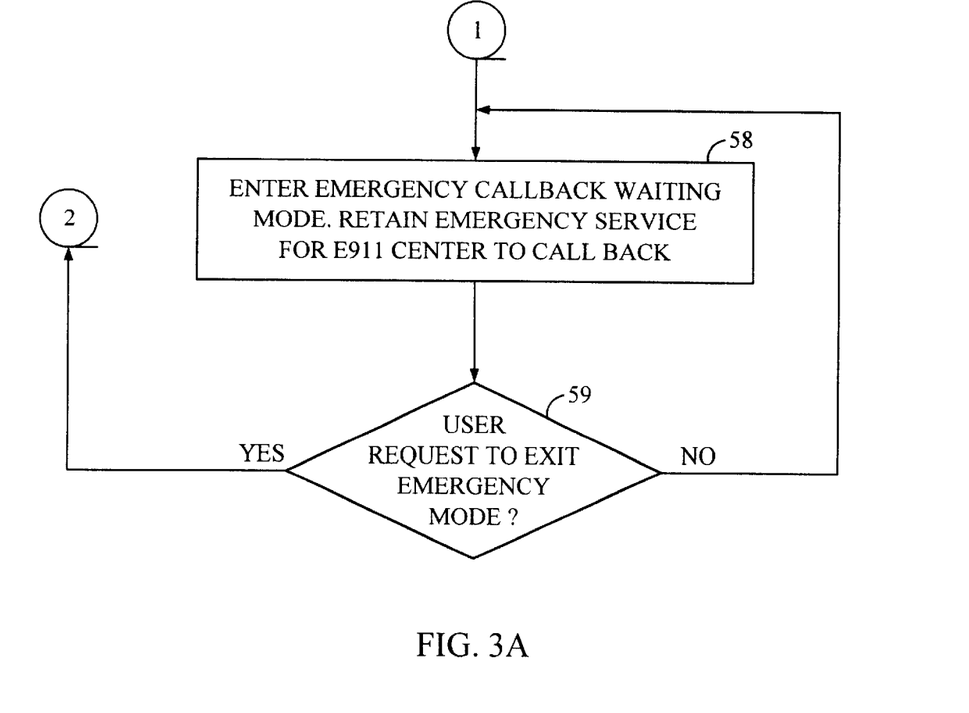

Referring to FIGS. 3 and 3A, there is shown a method for a mobile radio unit to acquire emergency service from one or more candidate mobile radio telephone systems. A user 18 powers up the mobile radio unit as shown in step 42. In step 44, the mobile radio unit builds a channel/system scan list in accordance with the preferred roaming list 24 and uses a pre-existing algorithm, well known in the art, to acquire the most preferred service. In other words, there is an attempt, at the mobile radio unit, to acquire normal non-emergency service and if a service is provided the mobile will stay in an idle state until an attempt is made to place a call from or receive a call at the mobile radio unit. Step 44 is well known in the art.

Regardless of whether the attempt to acquire non-emergency service fails in step 44, if the user attempts to originate an emergency call as shown in step 46 then, in step 48, the method enters an emergency serving system acquisition mode. In one embodiment, the user attempts to originate an emergency call by entering one of a plurality of emergency phone numbers such as "911", "*911" and "#911" into the mobile unit's telephone keypad. In the preferred embodiment, "911", "*911" and "#911" are always treated as emergency numbers and are hard-coded as emergency numbers into the mobile unit. Further, there can optionally be additional emergency phone numbers programmed into the mobile unit's non-volatile memory. If the user enters one of the emergency numbers into the mobile unit keypad, this will be treated in step 46 as an attempt by the user to originate an emergency call, and the system will enter the emergency serving system mode and build an emergency system scan list.

The emergency scan list built in step 48 has several portions and is ordered as shown in Table I below. The first portion of the emergency scan list includes any AMPS A and B channels that are supported by the mobile telephone unit. The second portion of the emergency scan list is only built if the mobile unit had previously received, while in the idle state in step 44, a (Global) Service Redirection Message and was in the process of scanning the CDMA channels in the redirection record of the (Global) Service Redirection Message when the system entered the emergency service acquisition mode. A (Global) Service Redirection Message is a message that indicates that a group of mobile units or a particular mobile unit must redirect its communications through one of the service(s) specified in the redirection record of the (Global) Service Redirection Message. If the mobile unit receives a (Global) Service Redirection Message that applies to the mobile unit after the mobile unit has acquired non-emergency service (step 44), the mobile station will begin scanning the specified channels in the (Global) Service Redirection Message in an attempt to acquire service on one of the specified channels. If, during this scanning process, the user attempts to originate an emergency call, the as yet unscanned channels in the (Global), Service Redirection Message will be placed in the second portion of the emergency scan list. The third portion of the emergency scan list includes all CDMA channels that the mobile radio unit has been able to acquire since the last power cycle in the most recent order. This portion of the emergency scan list will normally be built when the phone initially enters the emergency serving system acquisition mode. The fourth portion of the emergency scan list includes all past CDMA channels (other than those CDMA channels set forth in the previous portions of the emergency scan list) that the phone has ever acquired and is built using the most recently used (MRU) table. In one embodiment, the CDMA channels from the last power up cycle are held in volatile memory while those CDMA channels from the fourth portion of the emergency scan list are held in non-volatile memory. The fifth portion of the emergency scan list is the CDMA channels specified in the PRL and not included in the previous portions of the emergency scan list, and the sixth portion of the emergency scan list is all preferred CDMA channels listed for initial acquisition in the applicable air interface standard(s) and not contained in the previous portions of the emergency scan list. Portions of the emergency scan list can and will most likely include "negative" systems, i.e., systems on the PRL which are not available for non-emergency service as specified by the service provider.

Emergency Scan List

TABLE I

| ORDER | CHANNELS |
|---|---|
| 1. | AMPS A and B (if supported). |
| 2. | This portion is only built if the mobile unit had previously received, while in the idle state, a (Global) Service Redirection Message and was in the process of scanning the CDMA channels in the redirection record of the (Global) Service Redirection Message when the system entered the emergency service acquisition mode. If built, this portion contains the as yet unscanned channels in the (Global) Service Redirection Message. |
| 3. | Any CDMA channels not listed above that the phone has been able to acquire since the last power cycle in the most recent order. |
| 4. | The CDMA channels in the MRU table that are not listed above. |
| 5. | The CDMA channels in the PRL that are not listed above. |
| 6. | All "preferred" CDMA channels listed for initial acquisition in the applicable air interface standard(s) and not listed above. |

While step 48 is shown as occurring after step 44, it will be recognized by those skilled in the art that step 48 could be performed before or simultaneously with step 44, if desired.

In step 50, the method accesses the serving system acquisition algorithm more fully discussed below in accordance with FIG. 4, to acquire an emergency service quickly from the emergency scan list in cases where no non-emergency service was acquired in step 44. In cases where no non-emergency service was acquired in step 44, this is accomplished by scanning the emergency scan list 26 containing a plurality of systems and acquiring an emergency service from the list. If no service is acquired, then step 50 is repeated. If service is acquired in step 52 then, as shown in step 54, the mobile radio unit originates the emergency call using the service acquired in step 50. If the emergency service origination succeeds, as shown in step 56, then in step 58 the mobile radio unit receives a base station message which assigns a traffic/voice channel to the mobile radio unit and after the traffic/voice channel is released (e.g., following completion of an emergency call originated by the user), the mobile radio unit enters an emergency callback waiting mode. The emergency callback waiting mode is a state where the mobile unit stays idle on the system where the E911 origination was made and waits for the E911 center to call back. The method continues to remain in the callback waiting mode 58 until the user requests to exit, as shown in step 59. If the origination is not successful, the method returns to step 50 and the process described above (i.e., steps 50 to 56) is repeated again.

Figure 4:
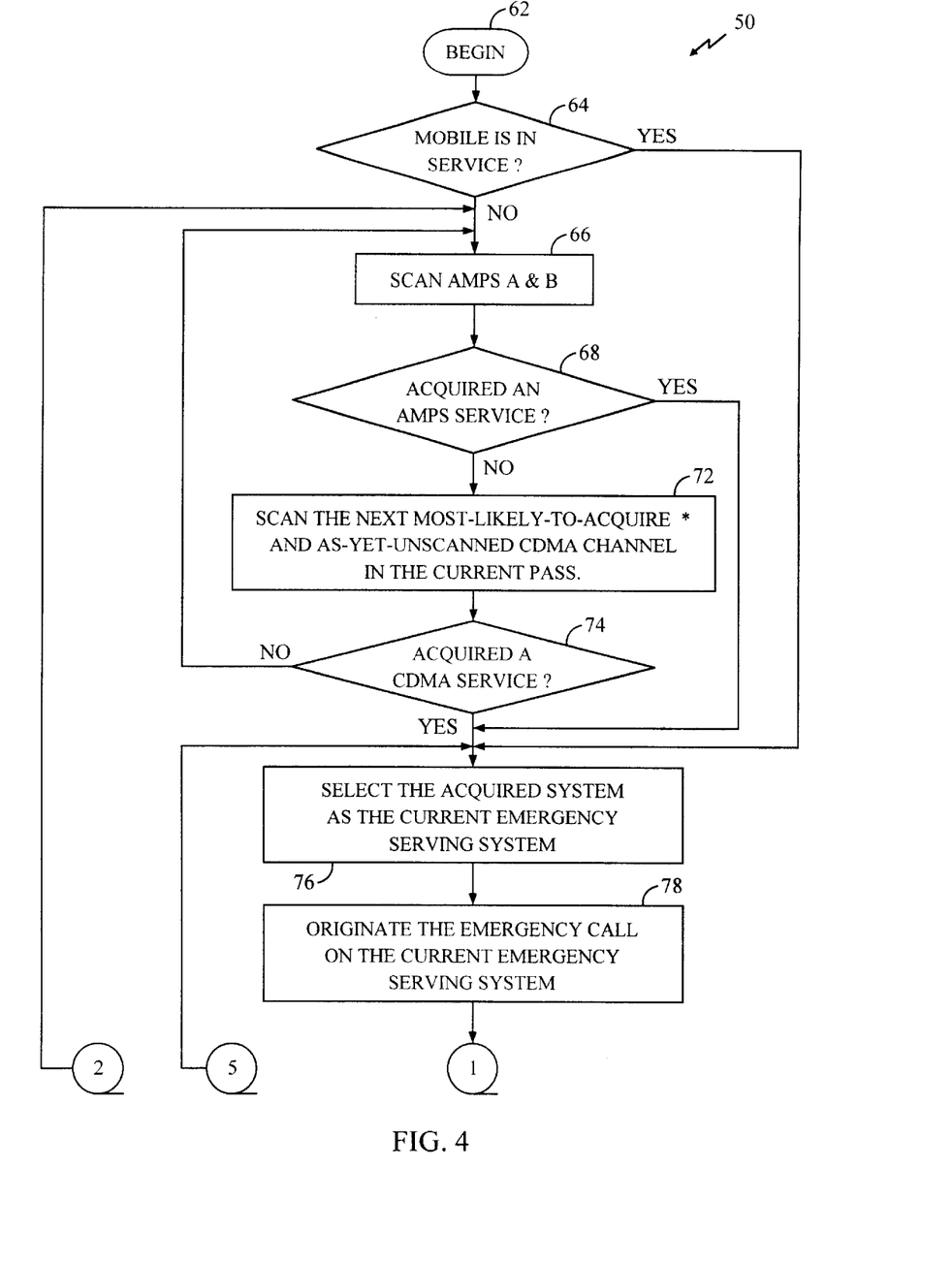
FIGS. 4, 4A, 4B show a flow diagram of a system for scanning an emergency scan list to acquire emergency service in accordance with the present invention.
Figure 4A:
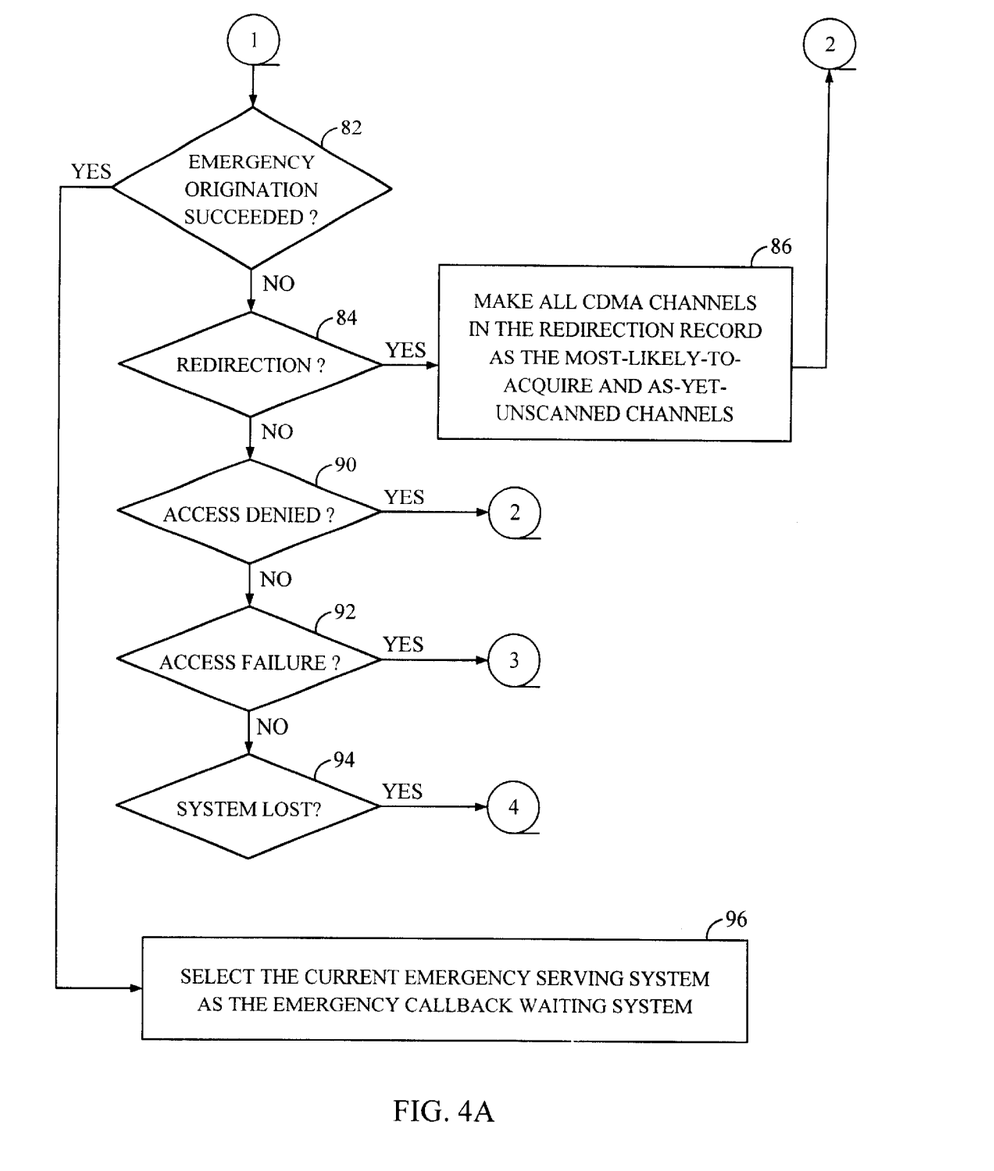
Figure 4B:
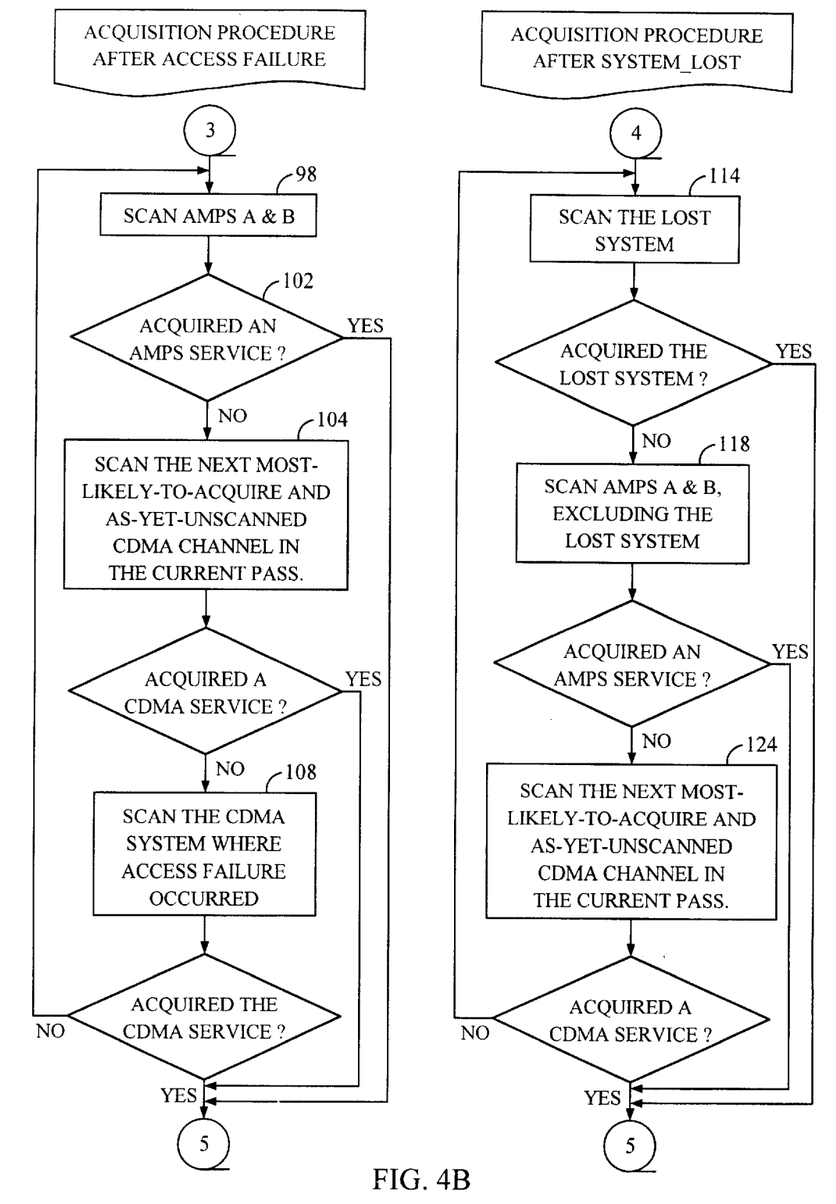

FIGS. 4, 4A, 4B show a flow diagram of a system for scanning emergency scan list 26 to acquire emergency service. By way of overview, the system shown in FIGS. 4, 4A, 4B allows a mobile unit to acquire emergency service in cases where the phone has been unable to acquire normal non-emergency service. If the phone has acquired non-emergency service (in step 44) and is in the idle state when a user attempts to originate an emergency call, the mobile unit simply places the emergency call on the previously acquired non-emergency serving system. Similarly, if the phone previously acquired non-emergency service (in step 44) but the phone is searching for a more desirable service when an emergency origination is made, the phone attempts to reacquire the last system which provided service, and the origination is then placed on that previously acquired non-emergency serving system. However, if non-emergency service was not acquired in step 44 or the mobile unit is in the process of scanning the channels specified in a Global Redirection Message and no acquired service is therefore present when the emergency origination is made, the phone will start scanning the emergency scan list in the order shown in Table 1 and attempting to acquire the channels set forth in the emergency scan list. As explained more fully below, the AMPS A and B channels on the emergency scan list are scanned first in an attempt to acquire service and, thereafter, the CDMA channels on portions 2–6 of the list are scanned channel by channel within each portion. After each unsuccessful attempt at acquiring a CDMA channel in a given portion of the emergency scan list, the AMPS A and B channels on the emergency scan list are scanned. That is, all the AMPS channels both A and B are scanned as a bundle. However, the CDMA channels within a specified portion are scanned one channel at a time. Therefore, after a CDMA channel within a specified portion is scanned, the analog channels are scanned before returning to the specified portion to scan the next CDMA channel in that portion. The phone will continuously search for service as shown in FIGS. 4, 4A, 4B (and will not go into a sleep mode) until an emergency serving system is acquired. If an emergency serving system is acquired at any time during this emergency acquisition mode, the phone will stay on that acquired system and attempt to originate the emergency call without regard to whether the system is specified, based on the PRL, to be accessible for normal service or not. If and when the END key on the phone is depressed, the phone will exit the emergency mode of operation and return to the normal mode of operation.

FIGS. 4, 4A, 4B, show the details of the emergency serving system acquisition method used in step 50 discussed above with reference to FIG. 3. The method begins at step 62 and determines if the mobile radio unit is in service at step 64. The mobile radio unit will already be in service in step 64 in cases where non-emergency service was acquired in step 44. If the mobile radio unit has not acquired service or is in the process of handling a (Global) Service Redirection Message, then at step 66, the system scans AMPS A and B channels on the emergency scan list and attempts to acquire service from such channels. The analog channels are scanned in step 66 in a particular order. First, for dual mode cellular phones (i.e., phones that support both analog and CDMA service), if the mobile unit had acquired non-emergency service on a CDMA channel of a Cellular System B immediately before entering emergency service (and for some reason such non-emergency service was lost) or if the Cellular System B is the mobile's home system, then the phone will try to acquire AMPS B first (and AMPS A second) if the emergency service origination attempt on the previously acquired CDMA channel fails. In all other cases, the mobile radio unit tries to acquire AMPS A first (and AMPS B second) during the first pass of the analog system channels in step 66. If service is acquired at step 68, the process transfers to step 76 and the acquired system is selected as the current emergency serving system. If no service is acquired during the first scanning of the AMPS A and B channels, the system proceeds to step 72 where the system scans the first CDMA channel (if any) contained in portion 2 of the emergency scan list and attempts to acquire service from such channels. (If there are no CDMA channels in portion 2, then the system attempts to acquire service from the first channel in portion 3 of the emergency scan list.) As stated earlier, each CDMA channel scan is interleaved with complete scans of the analog channels. That is the scanning procedure toggles back and forth between the next CDMA channel in the portion of the emergency scan list being scanned and a complete scan of the AMPS A and B channels. This process is repeated until all the CDMA channels in portions 2–6 of the emergency scan list have been scanned once. When the present invention is implemented in a mobile unit that supports both CDMA and analog service, this "first pass" of the CDMA channels in the emergency scan list is preferably performed using only a "mini scan" of each CDMA channel in the emergency scan list. A mini scan is a scan which detects only those CDMA channels exhibiting a strong signal and may therefore be performed more rapidly than a normal (full) channel scan. In this embodiment, the second pass and subsequent passes of the CDMA channels on the emergency scan list are performed using full scans. Thus, once the last CDMA channel in the scan list is scanned in step 72, the system moves to the first CDMA channel in the scan list and scans this channel during the next iteration of step 72. This process is repeated until either AMPS or CDMA service is acquired in step 68 or step 74 respectively.

When the phone is in the emergency mode, the phone disables or ignores certain protocols that are in place during non-emergency operation. In particular, if the mobile unit acquires service through scanning of AMPS or CDMA channels in step 66 or step 72, the system will not compare the acquired service with the "negative" system list included in the PRL, and will not reject any acquired system designated as negative in the PRL. Also, if the mobile unit acquires a service in step 72 through scanning of CDMA channels from a (Global) Service Redirection Message, the system will not check if the acquired system is a "wrong system/network" and will not reject a service that is designated as "wrong system/network" by the (Global) Service Redirection Message. This stands in sharp contrast to non-emergency operations, where all such channels would be rejected and no service would be provided thereon. Also disabled is the idle timer in the phone. Normally, when a user is placed on a less than preferred channel, the system will, after a predetermined time, search for a more preferred channel. However, in the emergency mode, this function is disabled since the system wants to stay with whatever channel has been acquired rather than scanning for a further channel. In other words, the system does not want to take a chance on losing service while in the emergency mode and, accordingly the timer function is disabled. In the emergency mode, the system also sets the CDMA Available GAM (CDMA Available Global Action Message) ignore flag. Normally, during non-emergency operations, if a user has both digital and analog capability, the CDMA Available GAM will, if a user is operating using analog service, cause the system to begin to search for a CDMA channel and switch the user to that channel if it is available. Again, since the phone is in emergency mode, it is better to stay on whatever channel the user has acquired, rather than risking a switch to a further channel.

In addition, the system will not check the Auto-NAM (automatic switching of number assignment module) during the emergency mode. The Auto-NAM is based on services selected by a user. Each area has a unique numerical assignment. For example, one who travels frequently to say two different cities, may select a service provider in San Diego having a numerical assignment and one in Philadelphia which has its own unique numerical assignment. The phone normally would automatically switch between the two cities as the user enters those areas. However, this check is omitted during the emergency mode.

Similarly, the system does not check the SID/NID (System Identification and Network Identification) of acquired systems against the SID/NID lock list included in the phones. This lock list is typically used to reject services set forth in the list during normal non-emergency operations.

As shown in FIG. 4, whenever service is acquired by any one of the iterations discussed above, the system proceeds to step 76 and selects the acquired system as the current emergency serving system. At step 78, an emergency call is originated on the current emergency serving system and if the origination is successful at step 82, the system proceeds to step 96 and selects the current emergency serving system as a callback waiting system, i.e., the system that will be used to contact the mobile subscriber when, for example, an E911 operator returns an emergency call originated by the user in step 78. If the emergency call was not successful in step 82, it could be because the phone was redirected as shown at step 84 via a (Global) Service Redirection Message before the emergency call was placed. In this event, the system will insert the systems corresponding to the SID/NID fields in the (Global) Service Redirection Message into the emergency scan list immediately after the CDMA channel scanned during the last iteration of step 72. Next, the system returns to step 66 and begins again the process of scanning for service as discussed above. That is, the phone begins scanning the emergency scan list in the order as previously discussed at step 66 except that, during the next iteration of step 72 the system will begin the scan of CDMA channels with the first system set forth in the (Global) Service Redirection Message, (rather than with the first CDMA channel on the list), and the process is repeated from that spot on the list. If the emergency call was not successful in step 82 and the phone was not redirected as shown at step 84 via a (Global) Service Redirection Message before the emergency call was placed, then in step 90 the system returns to step 66 and begins again the process of scanning for service as discussed above.

An "access failure" occurs when the phone is able to receive the signal from the base station but tries unsuccessfully to transmit a message to the base station. If an access failure (step 92) occurs in a CDMA system where service was acquired and, as a result, the origination failed in step 82, then the phone attempts to reacquire a service by scanning the analog channels in the first portion of the emergency scan list at step 98 if the phone is analog capable. If no AMPS service is acquired as shown in step 102, the next as yet unscanned CDMA channel from the current pass of emergency scan list is scanned at step 104. If no service is acquired, then the system where the access failure occurred is scanned at step 108. If no service is acquired, the steps are repeated as shown in FIG. 4B. If service is acquired, the acquired system is selected as the current 911 or emergency serving system and is used to originate the emergency call in step 78.

If a previously acquired emergency system is lost (step 94), and as a result, the origination failed in step 82, then the phone shall attempt to reacquire the lost service or acquire another service. In acquiring emergency service, the order of the scan is to first scan the lost system in step 114, then scan the analog systems 118 in the first portion of the emergency scan list excluding those AMPS Channels of the lost system, and finally scanning the next as yet unscanned CDMA channel from the current pass of the emergency scan list at step 124. This scanning order repeats itself until service is acquired.

Whenever the user requests to exit the callback waiting state (by pressing "END" on the keypad), the phone shall return to its normal mode of operation.

During an emergency call except for CDMA-to-CDMA inter-frequency hard handoffs, if the phone is handed off to another system (via hard handoff to a system with a different SID, hard handoff to AMPS, etc.) the phone shall honor the handoff and consider the new system as the system on which to stay while in the callback waiting state. However, when CDMA-to-CDMA inter-frequency hard handoff occurs, the CDMA system from which the handoff occurred remains as the callback waiting system.

Figure 5:
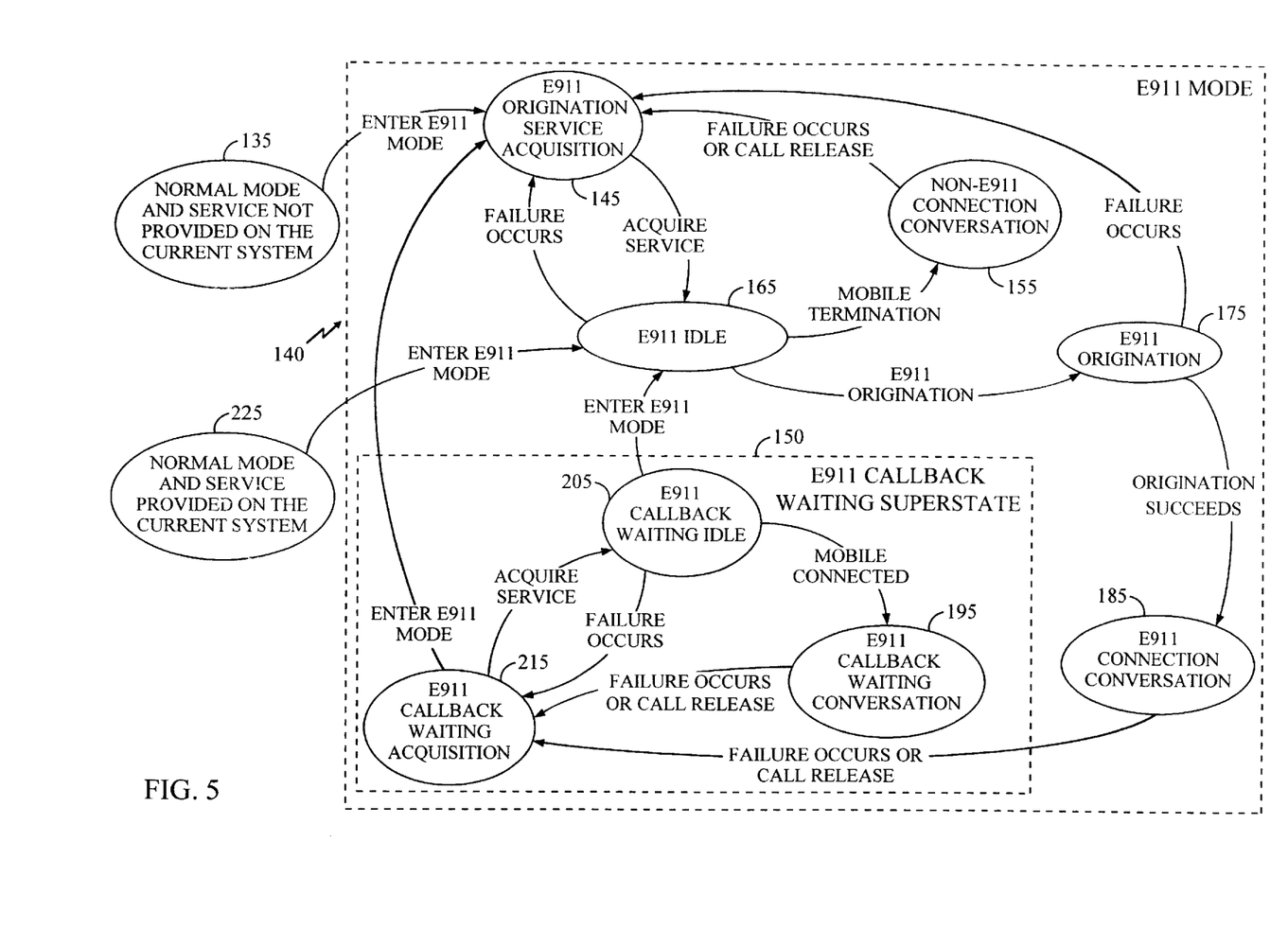
FIG. 5 is a state diagram illustrating the various states of operation of a mobile radio unit that functions in accordance with the present invention.

Referring to FIG. 5, there is shown a state diagram illustrating the various states of operation of a mobile radio unit that functions in accordance with the present invention. The event "failure occurs" shown in FIG. 5 corresponds, depending on the current state of the mobile unit, to a system loss or access failure (as such terms are used above), receipt of a (Global) Service Redirection Message, or a condition where the mobile unit becomes locked. FIG. 5 shows;an emergency mode 140 and a callback waiting super state 150. The system enters the emergency mode 140 from the normal mode which is either providing 135 or not providing 225 service on the current system. From the normal mode with no service provided on the current system state 135, the system enters the emergency mode and enters the emergency origination service acquisition state 145. From the emergency origination service acquisition state 145 the system enters the emergency idle state 165. From the emergency idle state 165 the system can enter the non-emergency connection conversation 155 and can in turn reenter the emergency origination service acquisition state 145 if a failure occurs or the call is released after entering state 155. In addition, the system can also from the emergency idle state 165 enter the emergency origination state 175 whereupon if a failure occurs the system will reenter the emergency origination service acquisition state 145. If the emergency origination succeeds from state 175, then the system enters an emergency connection conversation state 185. From the connection conversation state 185, the phone can enter the emergency callback waiting superstate 150, if failure occurs or the call is released. If the phone is in the emergency callback waiting acquisition state 215 and the phone enters state 215 because of a call release, then the phone enters the emergency callback waiting idle state 205. After the emergency call is completed, and then waiting the service may be also lost. This is shown as going from state 205 to state 215. From state 205 the phone can either enter the emergency idle state 165 or the emergency callback waiting conversation state 195. In the emergency callback waiting idle state 205, a call is received and processed as in normal mode. That is, the phone enters the emergency idle state 165. If failure occurs, the phone enters the emergency callback waiting acquisition state 215 and attempts to acquire the last system having service. From state 205 to state 195, the emergency call is connected.

When using the normal mode and service is provided, the system enters the emergency idle state 165 directly. That is, the origination service acquisition state 145 is not entered before the system enters the emergency idle state. After entering the emergency idle state the system proceeds as discussed above.

It will be understood by those skilled in the art that variations could be made to the emergency scan list and that other scan states be implemented without departing from the scope of the invention.

What is claimed is:

1. A method for a mobile radio unit to acquire emergency service from one or more candidate mobile radio communication systems, comprising:

(a) attempting, at the mobile radio unit, to acquire normal non-emergency service;

(b) if said attempt fails in step (a) and a user of said mobile radio unit originates an emergency call then;
  (i) scanning an emergency scan list containing said one or more candidate mobile radio communication systems in order to acquire emergency service, wherein said emergency scan list differs from a preferred roaming list stored in said mobile radio unit, the scanning including a first scan of any available AMPS A and B channels, and a second scan if a Service Redirection Message is received by said mobile radio unit, whereby the second scan involves scanning identified channels associated with said one or more candidate mobile radio communication systems one channel at a time in an order provided by the Service Redirection Message; and
  (ii) originating said emergency call in accordance with said acquired emergency service.

2. The method of claim 1, further comprising interleaving said AMPS A and B channels with each scanning of an identified channel in said Service Redirection Message.

3. The method of claim 2, wherein said scanning step further comprises, if no service is acquired during said first scanning and if no Service Redirection Message has been received by said mobile radio unit, third scanning identified channels acquired since last power down one channel at a time and interleaving said AMPS A and B channels with each scanning of said identified channels acquired since last power down.

4. The method of claim 2, wherein said scanning step further comprises scanning channels stored in a most recently used (MRU) table one channel at a time and interleaving said AMPS A and B channels with each scanning of a channel in said MRU table.

5. The method of claim 4, wherein said scanning step further comprises scanning channels stored in a preferred roaming list one channel at a time and interleaving said AMPS A and B channels with each scanning of a channel in the preferred roaming list.

6. The method of claim 5, wherein said scanning step further comprises scanning all preferred channels one channel at a time and interleaving said AMPS A and B channels with each scanning of said preferred channels.

7. The method of claim 1, wherein after an emergency service is acquired, the mobile radio unit enters a callback waiting mode after completion of an emergency call.

8. A method for a mobile radio unit to acquire lost emergency service from one of a plurality of candidate mobile radio communication systems, comprising the steps of:
  (a) scanning a lost system and, if no service is provided, attempting to acquire emergency service by performing step (b)
  (b) scanning AMPS A and B channels excluding those AMPS channels in said lost system and, if no service is provided, attempting to acquire emergency service by performing step (c);
  (c) scanning CDMA channels from a location on an emergency scan list where a previous scan of CDMA channels stopped.

9. The method of claim 8, wherein if no service is provided from scanning the CDMA channels from where said previous scan stopped, scanning said lost system and if no service is provided then scanning said AMPS A and B channels excluding those AMPS A and B channels in said lost system.

10. The method of claim 9, wherein if no service is provided from said AMPS A and B channels, then scanning the next CDMA channel from where said scan previously stopped.

11. The method of claim 8, further comprising repeating steps (a) through (c) until emergency service is acquired.

12. The method of claim 8, wherein if emergency service is acquired, entering a callback waiting mode after completion of an emergency call.

13. A mobile radio unit having the ability to acquire an emergency service from one or more candidate mobile radio communication systems comprising:
  means to acquire normal non-emergency service;
  means for, when normal non-emergency service is not acquired, originating an emergency call comprising;
    means for scanning an emergency scan list containing said one or more candidate mobile radio communication systems, wherein said emergency scan list is different from a preferred roaming list stored in said mobile radio unit, the scanning involving a first scan of any available AMPS A and B channels, and a second scan if a Service Redirection Message is received by said mobile radio unit, whereby the second scan involves scanning identified channels associated with said one or more candidate mobile radio communication systems one channel at a time in an order provided by the Service Redirection Message;
    means for selecting an emergency service from the emergency scan list; and
    means for originating said emergency call in accordance with said selected emergency service.

14. The apparatus of claim 13, wherein said identified channels comprise CDMA channels.

15. The apparatus of claim 14, wherein said CDMA channels are CDMA channels stored in a Service Redirection Message.

16. The apparatus of claim 14, wherein said CDMA channels are CDMA channels acquired since a last power down.

17. The apparatus of claim 14, wherein said CDMA channels are CDMA channels stored in a MRU table.

18. The apparatus of claim 14, wherein said CDMA channels are CDMA channels in said preferred roaming list.

19. The method of claim 14, wherein said CDMA channels are preferred PCS band and cellular band CDMA channels.

20. The apparatus of claim 13, further comprising means for entering a callback waiting mode.

21. In a mobile radio unit, an apparatus for selecting an emergency service from one of a plurality of candidate mobile radio communication systems, comprising:
  a transceiver that receives signals from one or more candidate mobile radio communications systems; and
  system selection software, coupled to the transceiver, wherein the system selection software originates an emergency call when normal non-emergency service is not acquired by scanning an emergency scan list containing said one or more candidate mobile radio communication systems, selecting an emergency service from the emergency scan list, and originating said emergency call in accordance with said selected emergency service, wherein said emergency system scan list is different from a preferred roaming list stored in said mobile radio unit,
  the scanning involving a first scan of any available AMPS A and B channels, and a second scan if a Service Redirection Message is received by said mobile radio unit, whereby the second scan involves scanning identified channels associated with said one or more candidate mobile radio communication systems one channel at a time in an order provided by the Service Redirection Message.

22. The apparatus of claim 21, wherein the identified channels comprise CDMA channels and AMPS A and B channel when the latter are available.

23. A method for a mobile radio unit to acquire emergency service during an access failure where the mobile radio unit is able to receive a signal from a base station but the mobile radio unit is unable to transmit to the base station, from one of a plurality of candidate mobile radio communication systems, comprising the ordered steps of:

(a) scanning AMPS A and B channels and if no service is provided;

(b) scanning a next CDMA channel from an emergency scan list; and (c) scanning a channel where the access failure occurred.

24. The method of claim 23, wherein if no service is acquired after said scanning said channel where the access failure occurred, repeat steps (a) through (c).

25. The method of claim 23, wherein after emergency service is originated, the mobile radio unit enters a callback waiting mode after completion of an emergency call.

* * * * *